I. HUPP.
CLUTCH MECHANISM.
APPLICATION FILED JULY 8, 1918.
1,413,987.
Patented Apr. 25, 1922.
3 SHEETS—SHEET 1.
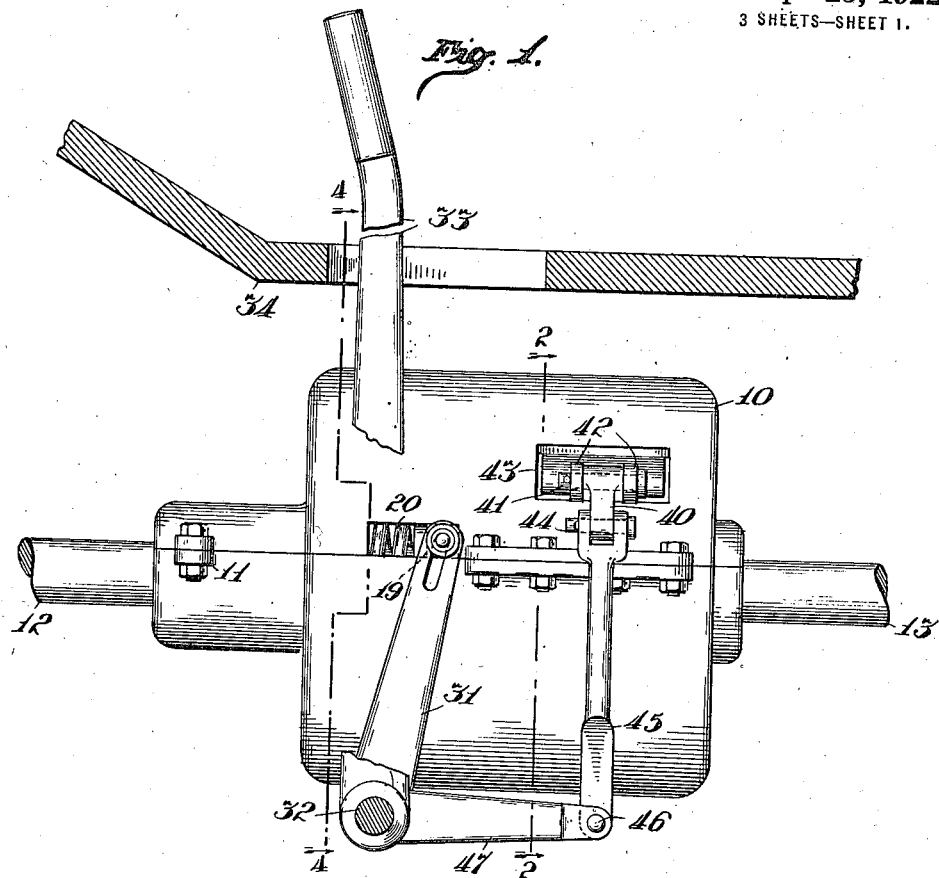
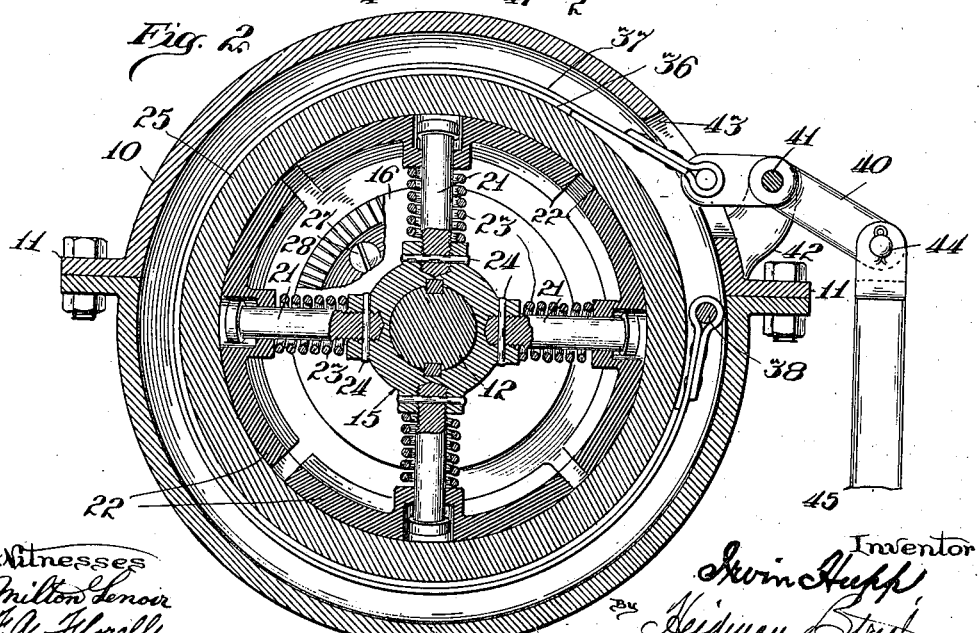
Witnesses
Milton Lenoir
F. A. Florell
Inventor
Irvin Hupp
By Heidman Streit
Attorneys

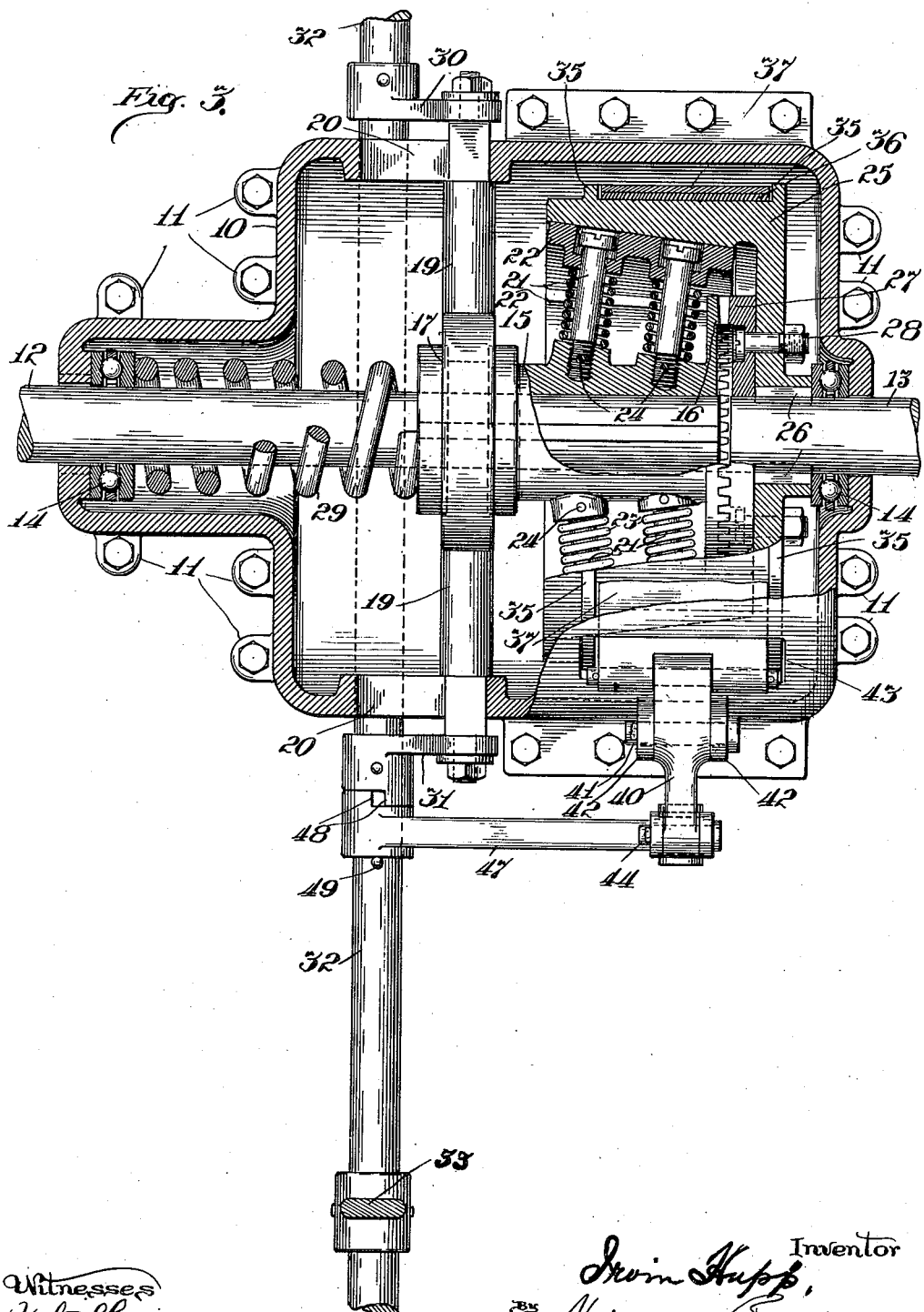

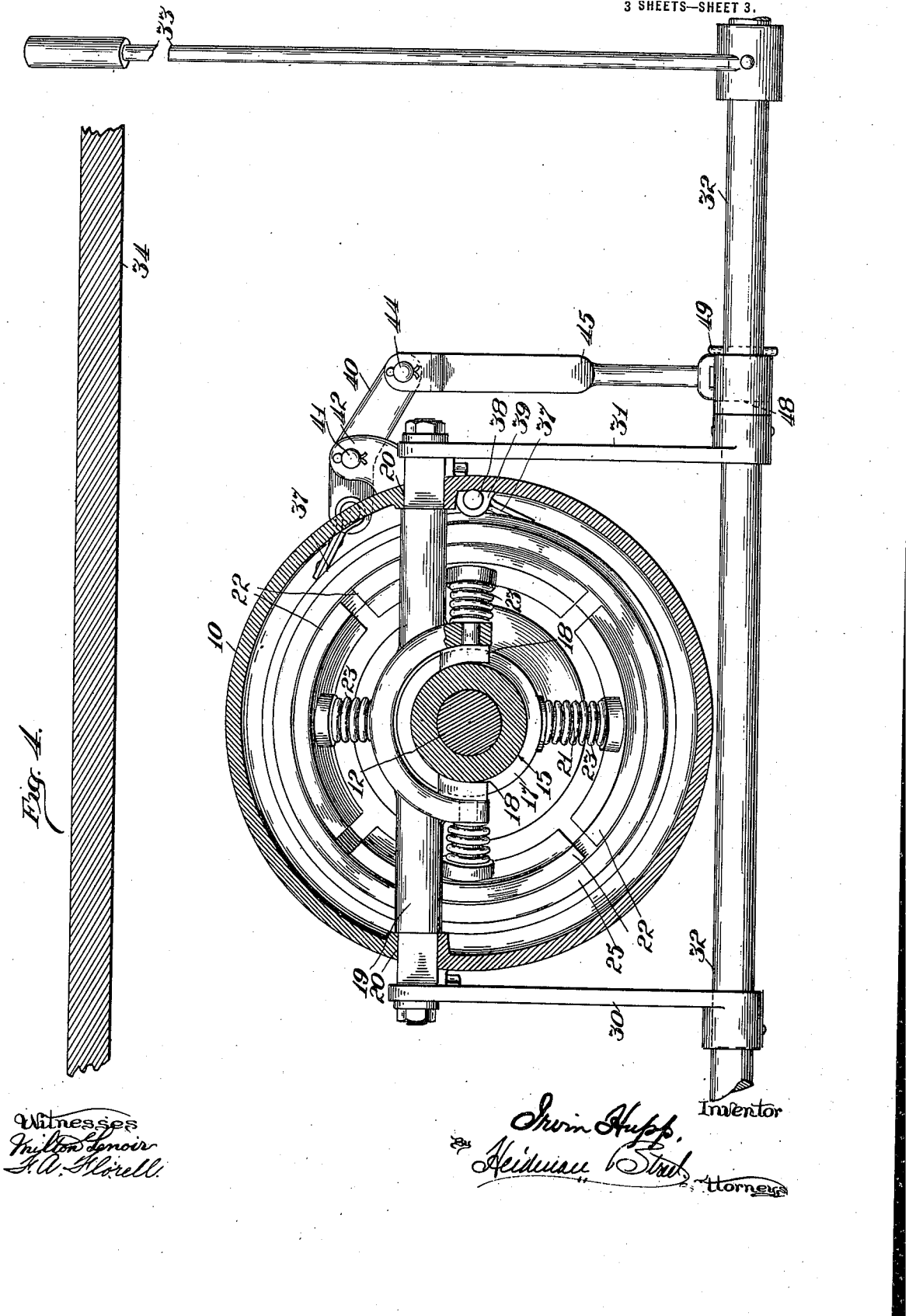

UNITED STATES PATENT OFFICE.

IRVIN HUPP, OF CHICAGO, ILLINOIS, ASSIGNOR, BY MESNE ASSIGNMENTS, TO FLEXO MOTIVE CORPORATION, A CORPORATION OF DELAWARE.

CLUTCH MECHANISM.

1,413,987.          Specification of Letters Patent.     Patented Apr. 25, 1922.

Application filed July 8, 1918. Serial No. 243,749.

*To all whom it may concern:*

Be it known that I, IRVIN HUPP, a citizen of the United States, and a resident of Chicago, in the county of Cook and State of Illinois, have invented certain new and useful Improvements in Clutch Mechanism, of which the following is a description, reference being had to the accompanying drawings, which form a part of my specification.

My invention relates to clutch mechanism more especially adapted for use on motor driven vehicles; having for its object the provision of suitable means whereby the engine or crank-shaft, or, in other words, the power-imparting shaft, may be frictionally and positively connected with the drive shaft of the vehicle; the mechanism being of such construction and arrangement that the power will be yieldingly transmitted to the vehicle or driven shaft and the load gradually taken up before a positive connection between the engine or crank-shaft and the driven shaft of the vehicle has been effected; the object of the invention being to provide means whereby an initially yielding frictional relation between the two shafts is produced in advance of the positive connection subsequently to be effected.

The operation and advantages of my improved construction will be more readily comprehended from the following detailed desription of the accompanying drawings, wherein:—

Figure 1 is a side elevation of my invention shown encased in a suitable housing or casing which receives the ends of the power-shaft and the driven shaft, portions of which are shown; while a portion of the operating lever is shown broken away and the position of the mechanism with its operating lever relative to the floor of the vehicle disclosed.

Figure 2 is a vertical sectional view, somewhat enlarged, taken on the line 2—2 of Figure 1, looking in the direction of the arrows.

Figure 3 is a top plan and sectional view of my improved mechanism; portions of the housing being broken away in order to disclose the internal construction.

Figure 4 is a vertical cross sectional view taken on the line 4—4 of Figure 1 looking in the direction of the arrows.

My invention is especially adapted for use on motor driven vehicles, and has for its object the provision of means whereby the engine or crank-shaft may be operatively connected with the drive shaft of the vehicle when in one position and braking relation with the drive shaft established when said means is in a second position; the invention comprising a suitable housing shown at 10, which preferably consists of an upper portion or cover and a lower portion removably secured together by suitable bolts disposed through lug portions or lobes, shown at 11 in Figures 1, 2 and 3. The housing is shown provided with hub-portions or extensions on opposite sides thereof adapted to receive the ends of two shafts and provide suitable bearing for the aligned ends of the shafts; one of which represents the engine or power shaft 12, while the other represents the driven shaft 13. The extensions or hub-portions of the housing or casing are formed to receive suitable thrust bearings indicated at 14, see Figure 3; the thrust bearings being in the nature of anti-friction ball bearings mounted in suitable race-ways or bearing members as shown.

Keyed on the inner end of the engine or power shaft 12, so as to have longitudinal movement on the shaft, is a connection-forming element or member 15, shown in the nature of an elongated hub or sleeve; which at one end terminates in a crown gear 16, which may be made integral with the sleeve 15 as shown; while the opposite end of the sleeve is somewhat enlarged and provided with a circumferential groove 17, see Figure 4, and also shown in dotted lines in Figure 3. The groove 17 is adapted to receive the blocks or inwardly disposed lugs 18, 18, secured to the yoke portion of a transversely disposed member 19. The ends of member 19 are preferably square in cross-section, as shown in Figure 3, and extend through slots 20, 20 formed in opposite sides of the housing 10, so as to permit the member 19 to be slid back and forth.

The elongated hub or sleeve portion 15 is provided at diametrically opposite points with radially disposed bosses, see Figures 2 and 3, having tapped apertures to receive the ends of the guide members or bolts 21 whereby segmental clutch-forming elements 22 are secured to the sleeve or hub-portion 15. In the construction shown, preferably two sets or circumferential rows of bosses are employed, arranged in parallel relation, with the tops of the bosses preferably slightly sloping toward the gear end of the sleeve and with the bosses at the gear-end of the sleeve of less height than those of the adjacent row, as shown in Figure 3.

The guide members or bolts 21 are each encircled with a suitable coil spring 23 one end whereof bears on the inclined top of its correlated boss, while the other end of the spring bears against a radially aligned boss formation on the segmental clutch-forming element 22. The boss formations on the inner sides of the respective segmental clutch-forming elements 22 are similarly sloped toward the gear end of the mechanism; and are each provided with sockets to receive the heads of the guide elements or bolts 21, see Figures 2 and 3. The guide elements or bolts 21 are of greater length than the diameter of the composite inner clutch member composed of the segments 22, so as to permit movement of the respective segmental members 22 toward and away from the sleeve or hub 15, namely in expanding and contracting directions. The bolts 21, after they have been screwed entirely into place, are preferably held against rotative movement by suitable pins 24 extending through the bosses formed on the hub or sleeve 15 and the inserted ends of the bolts 21, see Figure 2.

In the particular exemplification of the invention, I disclose four segmental members 22, each of which constitutes the segment of a hollow cone of such normal diameter as to permit expanding and contracting movement of the respective segmental portions or elements in the clutch-forming relation thereof with the correlated clutch element later to be described; the segments 22 constituting a collapsible cone clutch member. The composite collapsible clutch member, just described, is adapted to extend into the tapered opening of a second clutch member or cylinder 25. One end of cylinder or pulley 25 is provided with an end wall whereby the pulley or cylinder is supported from and secured or keyed as at 26 to the driven shaft 13.

The end wall of member 25 is provided on the inside with a crown-gear 27, which is shown secured thereto by means of bolts 28; and the gear 27 is adapted to mesh with gear 16 of hub or sleeve member 15 when the latter has moved longitudinally of power shaft 12 toward the extreme inner end thereof, as shown in Figure 3, where a positive as well as frictional relation between the connection-forming mechanism is disclosed.

The hub or sleeve 15, with the clutch-forming elements carried thereby, is normally forced into the cylinder and toward the connection-forming elements secured to the driven shaft 13 by a suitable coil spring 29, which preferably encircles the power shaft 12 whereby it is held in proper alignment; with one end bearing against the end of the hub or sleeve member 15, while the other end of the spring extends into the hub or extension of the housing 10 and bears against the plate or casing of the anti-friction bearing secured in said extension of the housing, see Figure 3.

The ends of the slidably mounted yoke member 19 are each provided with links 30 and 31, having slots in their upper ends for the ends of member 19, while the opposite ends of links 30 and 31 are suitably secured to a rock-shaft 32, which is disposed transversely of the housing of the mechanism, and therefore at right angles to the power and driven shafts, and is rotatably mounted in any suitable bearing beneath the body of the vehicle. The rock-shaft 32 is provided with a suitable operating member 33, which may be in the nature of a hand-lever or foot-pedal, disposed upwardly through a suitable slot or opening in the bottom of the vehicle body, as shown at 34 in Figure 1; the operating member 33 being secured to rock-shaft 32 so as to cause the latter to rock or rotate when the member 33 is manipulated. By reason of spring 29, it is evident that member 33 need merely be operated when it is desired to disengage the connection-forming elements between the power and driven shafts and when it is desired to apply the brake mechanism.

The clutch pulley member 25, which is keyed to driven shaft 13, is shown preferably provided with circumferential flanges 35 arranged in separated parallel relation with each other, see Figure 3, adapted to provide a brake-seat therebetween; the seat or portion intermediate of the flanges being preferably provided with a bronze lining or other suitable anti-friction material, as at 36. The brake element preferably consists of a steel brake-band 37 disposed about the pulley or cylinder 25. The brake-band 37 has one end secured permanently at the point 38 to the housing or casing 10 of the mechanism; the housing 10 being preferably provided on the inner surface thereof with one or more lugs, as shown at 39 in Figure 4, to receive the pin 38 about which the strap or band 37 is secured, as shown in Figure 2. The opposite end of the brake-band 37 is properly secured about a pin on an angularly formed link or arm 40, which is pivoted at 41 between a pair of lugs 42 formed integral with the side of the housing or casing 10. The casing 10, at a point coincident with the upper ends of the lugs 42, is provided with a suitable opening or slot 43 for the end of the band 37 and arm or link 40; the opening in the casing being sufficient to permit oscillatory movement of the arm 40 and enable contracting and expanding movements of the brake-band. The opposite end of link or arm 40 is pivotally secured at 44 between the bifurcated end of an arm 45; while the lower end of the arm 45 is pivotally secured at 46 to an arm 47. Arm 47 terminates preferably in an enlarged or hub-portion which fits about the rock-shaft or member 32. The end of link 31, like the end of arm 47, is also preferably shown in the nature of a hub through which the rock-shaft 32 passes, see Figures 3 and 4. The adjacent ends of the hub-portions of link 31 and arm 47 are notched or kerfed to receive the extended portions of the hubs and thus provide interlocking portions or shoulders as at 48, see Figure 3. The hub-portions of the link 31 and arm 47 are maintained in juxtaposed relation in any suitable manner, as for example by a pin 49 inserted in a suitable opening in shaft 32.

In the exemplification, the arm 47 is preferably loosely mounted on shaft 32, so that the normal positioning of the clutch mechanism through the action of spring 29 has no effect on the brake mechanism, which is left free to assume its normal or non-braking position. It is evident that when rock-shaft 32 is rocked or rotated for the purpose of applying the brake mechanism, namely when rock-shaft 32 is rotated to the left in Figures 1 and 3, the clutch or connection-forming mechanism is thereby moved against the action of spring 29 into non-clutching relation and arms 47 and 45 will be forced upwardly, through the interlocking relation effected between the hub-portions of link 31 and arm 47, thereby forcing the outer end of arm 40 upwardly, causing the inner end thereof to move downwardly, which will draw the brake-band 37 into firm frictional relation with the clutch pulley or cylinder 25, or rather with the anti-friction or bronze lining secured about the clutch pulley 25. It is apparent, therefore, that the brake mechanism cannot be applied while the clutch or connection-forming mechanism is in operative position, and vice versa; so that both mechanisms are simultaneously affected through movement of a single operating member; with the braking mechanism becoming effective only after the clutch or connection-forming elements have been shifted into inoperative position. With the expansible action of springs 23 limited by the bolts or members 21, and with the correspondingly tapered or cone formation of collapsible inner member and inner surface of the pulley or outer member, it is apparent that slight withdrawing movement of yoke member 19 will provide a non-clutching relation; this withdrawing movement of member 19 being permitted,—by reason of the extent of kerfing of the hub-portions on the ends of link 31 and arm 47,—before the extended portions of the hub-portions of link 31 and arm 47 come into interlocking relation and movement of the brake mechanism into braking position is effected.

As is evident from the construction, the operator need merely operate the lever or foot pedal when he desires to apply the brake; while on the other hand, the connection-forming mechanism, due to its yielding or expansible construction, will automatically provide a clutching relation which will gradually increase or become firmer as the load is "picked up" until a positive connection is eventually effected through the intermeshing of gears 16 and 27; the latter connection being made possible by the gradual slipping of the collapsible inner member and the strong pressure exerted by spring 29.

It will be apparent therefore, that power to the vehicle shaft is more or less flexibly or yieldingly applied at the initial or starting action, with the result that the sudden impulses and jars heretofore encountered, when the power and driven shafts are connected up, are eliminated and a gradual connection between the power shaft and driven shaft effected.

In order that a uniform pressure may be obtained throughout the width of each segment or portion of the inner clutch element, I prefer to provide each segment or portion 22 with a pair of expansible springs 23, preferably aligned lengthwise of the shaft as shown in Figure 3, with all of the bolts 21 of such length and adjustment that equal movement of both ends of the segments or portions may be had.

With the inner connection-forming element or telescoping clutch moved out of operative engagement with the outer connection-forming element or pulley, the respective segments of the inner member or expansible cone will become distended through the action of the various springs 23; but this distended or expanded condition is limited by the heads of the bolts or members 21. It will be seen therefore that the moment the operator releases the operating member or foot pedal, the spring 29 will cause the collapsible inner element to move inwardly a distance sufficient to permit a clutching relation being effected between the two elements; the frictional or clutching relation initially effected being such however as to prevent spring 29 immediately forcing the inner connection-forming element into the maximum position shown in Figure 3. The maximum clutch and ratchet or interlocking position will be accomplished in a progressive manner during the operation of "picking up" the load, whereby a gradual contraction or collapsing of the inner member is accomplished, and the inner element caused to slowly slip lengthwise of the outer element through the action of spring 29 until the extreme inner end of the outer member has been reached, where the two crown-gears 16 and 27 will mesh with each other and a positive driving connection between the two shafts will be provided.

It is also evident that with the comparatively large outer member or pulley 25 secured to the end of the driven shaft, adequate gripping surface is provided and considerable leverage obtained for braking purposes with the result that a very efficient brake is produced.

In practice, the improved clutch and brake mechanism herein described may be installed intermediate of the engine or crank shaft and the transmission of the motor driven vehicle; it will be understood therefore that the expression "drive shaft," as employed in the specification, would include the power-imparting shaft of the transmision, namely the shaft from which power is transmitted to the driven shaft of the vehicle through the medium of the transfer mechanism of intermeshing gears and auxiliary shaft; in other words, the mechanism is to be introduced intermediate of two aligned shafts for the purpose of operatively connecting said shafts together in a controllable manner.

I have shown and described what I believe to be a simple embodiment of my invention, but certain alterations may be made in details of construction without, however, departing from the spirit of my invention.

What I wish to secure by Letters Patent is:—

1. Clutch mechanism of the character described, comprising a hollow member adapted to be secured to the end of a shaft, a second member adapted to be slidably secured to the end of a second shaft and disposed within said hollow member, a plurality of segmental elements disposed about and in spaced relation with said second member, said elements and the first mentioned member being formed with coacting surfaces, guide members secured to and extending radially from said second member whereby said elements are yieldingly secured to the second member and the extent of outward movement of the elements controlled, springs disposed about the guide members intermediate of the second member and said segmental elements whereby the latter are yieldingly maintained in distended relation and held in frictional contact with the coacting surface of the hollow member, the inner ends of the hollow member and said second member being provided with correlated portions adapted to permit interlocking relation when the second member has reached the limit of its inward movement whereby a positive connection between the inner member and said hollow member and their respective shafts may be effected, flexible means whereby the second member is placed under yielding pressure and normally moved lengthwise of its shaft toward the inner end of the hollow member, and means operatively connected with the second member whereby the latter may be moved lengthwise of its shaft against the action of said flexible means.

2. Clutch mechanism of the character described, comprising a housing adapted to receive the ends of two aligned shafts, a hollow member secured to the end of one of the shafts so as to rotate therewith and having an inner tapered surface, a second member slidably secured to the end of the other shaft but adapted to rotate therewith and disposed within said hollow member, guide members removably secured to the second member and extending radially therefrom, a plurality of segmental elements mounted on the outer ends of said guide members so as to move in radial directions, said elements and the inner surface of said hollow member being formed with coacting surfaces, resilient means disposed about the guide members intermediate of the second member and said segmental elements whereby the latter are yieldingly maintained in distended relation, means secured to the inner end of the hollow member and inner end of said second member adapted to provide interlocking relation between said members when the second member has reached the limit of its inward movement, resilient means disposed about one of said shafts intermediate of one wall of said housing and one end of said second member whereby the latter with the segmental elements is forced toward the inner end of said hollow member, and operating means extending to the housing exterior whereby the second member may be moved lengthwise of its shaft against the action of said last mentioned resilient means.

3. Clutch mechanism of the character described, comprising an outer member or shell adapted to be keyed on the end of a shaft, said member being provided with an inner tapered or cone surface and a closed end, a sleeve member slidably secured to the end of a second shaft disposed within the outer member or shell, said sleeve member being provided with apertured bosses arranged in pairs, the bosses of each pair being aligned lengthwise of the sleeve member and tapered to correspond with the inner taper of the outer member, a guide member secured in each apertured boss and disposed radially therefrom and perpendicular to the tapered surface of the boss, a plurality of segmental elements mounted on the outer ends of each pair of guide members so as to move lengthwise of said members intermediate of the bosses and the inner cone surface of said outer member, a coil spring disposed about each guide member whereby the segmental elements are yieldingly forced into frictional relation with the inner cone surface of said outer member, crown gears secured to the closed end of the outer member and to the inner end of said sleeve member adapted to interlock and provide positive connection between the outer member and said sleeve member and their respective shafts when the maximum point of inward movement of the sleeve member is reached, resilient means whereby the sleeve member is normally forced toward said maximum point, and means whereby the sleeve member may be moved against the action of said last mentioned resilient means and out of operative relation with the outer member.

4. Clutch mechanism of the character described, comprising a housing provided with an extended hub portion, said housing being adapted to receive the ends of two aligned shafts, a hollow member or shell secured to the end of one of said shafts to rotate therewith, the inner surface of said hollow member being cone-shape, a sleeve member slidably secured to the end of the second shaft and disposed within the hollow member, said sleeve member being provided with apertured bosses arranged in pairs, the bosses of each pair being aligned lengthwise of the sleeve member and tapered to correspond with the inner taper of the cone surface of the hollow member, a guide member secured in each apertured boss and disposed radially therefrom and perpendicular to the tapered surface of the boss, a plurality of segmental elements mounted on the outer ends of each pair of guide members so as to move lengthwise thereof, said guide members being formed to limit the outward movement of the segmental elements, a coil spring disposed about each guide member intermediate of said bosses and said segmental elements whereby the latter are yieldingly forced into frictional relation with the inner cone surface of the hollow member, crown gears secured to the inner ends of said hollow member and said sleeve member adapted to interlock when said sleeve member has reached the maximum point of its inward movement and thereby provide positive relation between the sleeve member and said hollow member, a coil spring disposed about the shaft to which said sleeve member is secured, with one end of said spring seated in said extended hub portion of the housing while the other end bears against said sleeve member and normally forces the latter toward the inner end of said hollow member, and means operatively connected with the sleeve member and extending to the housing exterior whereby the sleeve member may be moved lengthwise of its shaft against the action of said coil spring.

Signed at Lima, in the county of Allen, and State of Ohio, this 28th day of June, A. D. 1918.

IRVIN HUPP.

Witnesses:
HARRY R. WHITE,
CLARA E. LONGMEIER.